Oct. 4, 1932.  A. B. EDWARDS, JR  1,880,922
CULINARY ARTICLE
Filed Feb. 24, 1930
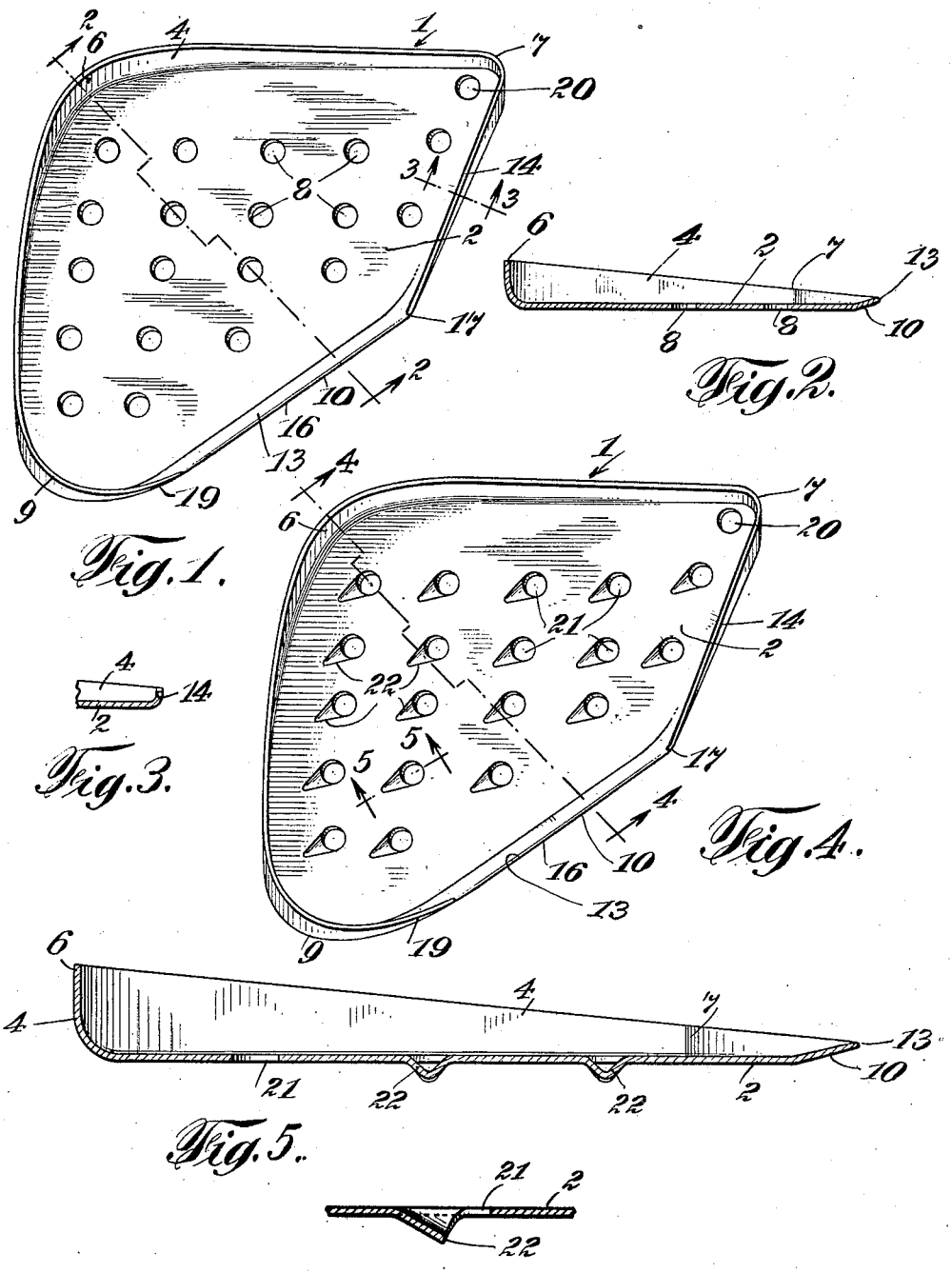
INVENTOR
Alfred B. Edwards Jr.
BY
Norman Holland
HIS ATTORNEY Patented Oct. 4, 1932

1,880,922

UNITED STATES PATENT OFFICE

ALFRED B. EDWARDS, JR., OF PLANDOME, L. I., NEW YORK

CULINARY ARTICLE

Application filed February 24, 1930. Serial No. 430,582.

The present invention relates to culinary articles and more particularly to a device adapted for cleaning kitchen utensils, sinks and the like.

It is a common occurrence when foods are cooked or fried, that a portion will adhere to the bottom and sides of the vessel. Frequently, the foods are burnt due to the lack of moisture, forming a residue in the pot. Upon cleaning the cooking utensils this residue is difficult to remove. Ordinarily, housewives attempt to scrape the residue with a knife. Such an instrument is not effective because the knife will not reach all portions of the vessel. The housewife frequently injures her hands on the blade of the knife. Such scraping with a knife dulls the blade and causes excessive wear. The material scraped from the pots and pans usually falls in the sink and has to be scooped up with the other refuse which may have lodged therein.

The present invention aims to provide a simple, inexpensive combination device or implement which cleans cooking utensils very effectively and is equally applicable in removing crumbs and refuse from sinks and other places. Other important uses will appear hereinafter. The scraping edges of the implement are so constructed that they reach all portions of any shape of utensil. The device also serves as a sink pan for scooping up and draining the refuse accumulated therein and is adapted to be kept in a convenient place. The draining apertures may be constructed to serve for grating or flaking soap and the like.

An object of the present invention is to provide an inexpensive device for cleaning cooking utensils.

Another object of the invention is to provide an inexpensive sink pan or scoop adapted to be conveniently kept which may in addition be utilized for other general purposes.

Another object of the invention is to provide a scraping device which is shaped to be easily gripped and held in one hand without danger of cutting or otherwise injuring the user's hand.

Another object of the invention is to provide an inexpensive combination kitchen utensil which is simple in construction and neat in appearance.

A further object of the invention is to provide a combined kitchen utensil adapted to be used as a sink pan, a pot and pan scraper, and for flaking soap or the like.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a perspective view of a preferred embodiment of the invention;

Fig. 2 is a sectional view taken along the line 2—2 of Fig. 1;

Fig. 3 is a sectional view along the line 3—3 of Fig. 1;

Fig. 4 is a perspective view illustrating another embodiment of the invention;

Fig. 5 is an enlarged sectional view taken along the line 4—4 of Fig. 4; and

Fig. 6 is an enlarged sectional view taken along the line 5—5 of Fig. 4.

Referring again to the drawing, there is shown a combination kitchen utensil 1 comprising a portion 2 and an upturned edge 4. Preferably, the portion 2 is substantially flat and merges into the upturned edge 4 which is adapted to reinforce the portion 2 and prevent it from being bent out of shape while the utensil is being used. The edge 4 also forms the cutting or scraping part of the utensil and its shape is such that the particles removed, or a substantial part of them, may be retained in the scraping utensil and deposited in a suitable receptacle. The narrow width of the upturned edge permits access to small utensils since it can be readily used with the substantially flat portion perpendicular or oblique to the surface being scraped. This portion may also be used as a holding edge without injury to the hands of the user. The upturned edge 4 is shaped to facilitate access to the corners and crevices of pots and pans and to be utilized for scooping up small quantities of refuse. This may be achieved by making the upturned edge substantially arcuate at the corner 6, with the portions leading to and from the corner substantially straight.

The turned-up edge 4 is deeper at the corner 6 and tapers gradually until it reaches the corners 7 and 9. The taper of the bent up edge facilitates its intended use, and strengthens the articles across the long axis where there is the greatest tendency to bend.

The part 10 of the device extending between corners 7 and 9 comprises three sections, 14, 16 and 19. The forward portion 16 of the pan is bent upwardly, as shown at 13, to facilitate scooping up, with a brush or otherwise, substantial quantites of refuse which may collect in a kitchen sink. A plurality of apertures 8 are provided to permit the drainage of moisture from the refuse. These apertures may be of any convenient size, and may be spaced to conform to the shape of the pan.

The edges of the portions 14 and 19, adjacent the part 16, are bent upwardly substantially perpendicularly to the bottom of the pan. These upturned edges are also useful as scraping parts for cleaning cooking utensils such as pots and pans. To better adapt it for this purpose, the portions 14 and 19 are disposed at angles to each other and to the part 16. The part 14 extends from the corner 7 and merges obliquely into the part 16 at 17. The angular meeting point 7 of the portions 4 and 14 is well adapted for removing extremely hard residues from the bottom or corners of cooking utensils. The scooping edge 16 merges into an arcuate edge portion 19 at the corner 9. It will be noted that the corners 7 and 9 are rounded. The scraping edges 4, 14, 16 and 19 may be constructed to conform to the various curvatures of the inner corners of cooking utensils, as well as to the bottoms and sides of such utensils. The several portions of the device adapt it for fitting into the corners and for reaching and removing the residues which adhere to the pots at any portion thereof.

By drawing the several edges across the portion of the utensil to be cleaned, the residues may readily be removed. When the article is not in use it may be placed in the corner of the sink but, preferably, an aperture 20, provided at the corner 7, is utilized for hanging it on a suitable nail or hook located near the sink.

A slightly different construction is shown in Figs. 4, 5 and 6. The apertures 21 in this construction have adjacent portions 22 pressed downwardly to form projecting edges adapted to flake soap and like materials. By having the depressions extend toward the corner 9 of the scoop, they do not interfere with the manipulation of the device, and permit the soap or other material being flaked to be drawn in the direction of greatest length.

The utensil described herein may be made of any suitable material such as tin plate or other sheet material. In order to prevent rust, it may be made of stainless steel or ordinary steel nickel plated. In some cases, a suitable lacquer or paint may be used. It will be understood that the invention is not limited to any particular kind of metal or material.

It will be seen that the invention described herein provides a handy article adapted for culinary use, which can be manufactured at a low cost to be sold to five and ten cent store syndicates. The edges of the scraper are formed to fit the bottom and sides of cooking utensils, of any shape or size, and are thereby adapted to remove the residues which adhere to the utensils during their use. The edges of the device are slightly tapered and, if desired, may be sharpened. The upturned edges of the article provide gripping means whereby the user will not sustain cuts or scratches, and also reinforces the flat portion of the scoop. The construction of the apertures for chipping or flaking soap is an added utility. The article is rugged in construction and is well adapted to withstand the rough handling to which it may be subjected.

As various changes may be made in the form, construction and arrangement of parts without departing from the spirit and scope of the invention as claimed and without sacrificing its advantages, it is to be understood that all matter herein is to be interpreted as illustrative and not in a limiting sense.

Having thus described my invention, I claim:

1. In a culinary article, the combination of a substantially flat bottom and a substantially perpendicular flange extending about the major portion of the periphery of said bottom, the periphery of said bottom intermediate the ends of said flange being bent upwardly and obliquely from the plane of the bottom, said bottom having a series of apertures therein, portions of the bottom adjacent the apertures being bent downwardly to form channels generally parallel to the edge of the oblique portion on the upper side of the bottom leading to said apertures.

2. In a culinary article, the combination of a bottom part having an upturned flange extending about the major portion thereof, said flange being substantially perpendicular to the plane of the bottom, the periphery of the bottom intermediate the ends of said flange being bent upwardly and obliquely to the bottom in the same direction as the flange and merging with the ends of said perpendicular flange.

3. In a culinary article, the combination of a bottom part substantially triangular in form and an upturned flange extending about the major portion of the periphery of said bottom, including the three corners thereof, the edge of the upturned flange forming acute angles at two of said corners and substantially an obtuse angle at the third corner, the periphery of the bottom intermediate the ends of said upturned flange being obliquely disposed with respect to the plane of the bottom, in the same direction as the flange and merging with the ends of said upturned flange.

4. In a culinary article, the combination of a bottom substantially triangular in form and an upturned flange extending about the major portion of the periphery of said bottom, including the three corners thereof, the edge of the upturned flange forming acute angles at two of said corners and substantially an obtuse angle at the third corner, the periphery of the bottom intermediate the ends of said upturned flange being obliquely disposed with respect to the plane of the bottom, said bottom having a series of apertures therein, the portions of the bottom adjacent the apertures being bent downwardly to provide channels generally parallel to the edge of the oblique portion on the upper side of the bottom leading to said apertures and edges offset below the under surface of said bottom.

5. A device of the class described, comprising a pan member having a substantially triangular gripping portion adapted to conform to the hand of the user to provide an effective grip, and an upturned substantially perpendicular edge extending about said member adapted to provide scraping and strengthening means, a portion of said edge being bent obliquely to the pan member in the same direction as the upturned edge and merging with the ends thereof to provide an entrance to said pan member.

ALFRED B. EDWARDS, Jr.